(12) United States Patent
Normark et al.

(10) Patent No.: US 8,428,097 B2
(45) Date of Patent: Apr. 23, 2013

(54) POWER EFFICIENT SOFTWARE RECEIVER FOR SPREAD SPECTRUM SIGNALS

(75) Inventors: Per-Ludvig Normark, Stockholm (SE); Christian Ståhlberg, Sollentuna (SE)

(73) Assignee: Nordnav Technologies AB, Stockholm (SE)

( * ) Notice: Subject to any disclaimer, the term of this patent is extended or adjusted under 35 U.S.C. 154(b) by 1204 days.

(21) Appl. No.: 12/088,055

(22) PCT Filed: Sep. 29, 2005

(86) PCT No.: PCT/SE2005/001446
§ 371 (c)(1),
(2), (4) Date: Aug. 5, 2008

(87) PCT Pub. No.: WO2007/037729
PCT Pub. Date: Apr. 5, 2007

(65) Prior Publication Data
US 2009/0010308 A1    Jan. 8, 2009

(51) Int. Cl.
*H04B 1/00*    (2006.01)
(52) U.S. Cl.
USPC .................. 375/130; 375/136; 375/137
(58) Field of Classification Search ............. 375/130, 375/134, 136–137, 145, 149
See application file for complete search history.

(56) References Cited

U.S. PATENT DOCUMENTS

| | | | |
|---|---|---|---|
| 5,592,173 A | 1/1997 | Lau et al. | |
| 5,920,283 A | 7/1999 | Shabeen et al. | |
| 6,002,363 A | 12/1999 | Krasner | |
| 2001/0047243 A1* | 11/2001 | Kohli | 701/213 |
| 2005/0200517 A1 | 9/2005 | Bloebaum et al. | |
| 2006/0068853 A1* | 3/2006 | Dejanovic et al. | 455/574 |

OTHER PUBLICATIONS

International Search Report.

* cited by examiner

*Primary Examiner* — Curtis Odom
(74) *Attorney, Agent, or Firm* — W. Kevin Ransom; Moore & Van Allen, PLLC

(57) ABSTRACT

The present invention relates to reception and processing of spread spectrum signals to produce position/time related data. A proposed receiver includes a radio signal processing unit, which is at least partly implemented in software running on a microprocessor. The processor is also adapted to effect at least one separate software-controlled function. The receiver is adapted to operate the radio signal processing unit on at least two processing intensity levels each with different processing times. Thereby, when the radio signal processing unit operates on a low processing intensity level, a first amount of processing capacity is available for the at least one separate software-controlled function; and when the radio processing unit operates on a high processing intensity level, a second amount of processing capacity is available for the at least one separate software-controlled function. When the processor's over-all processing capacity is constant, the second amount is smaller than the first amount.

25 Claims, 2 Drawing Sheets

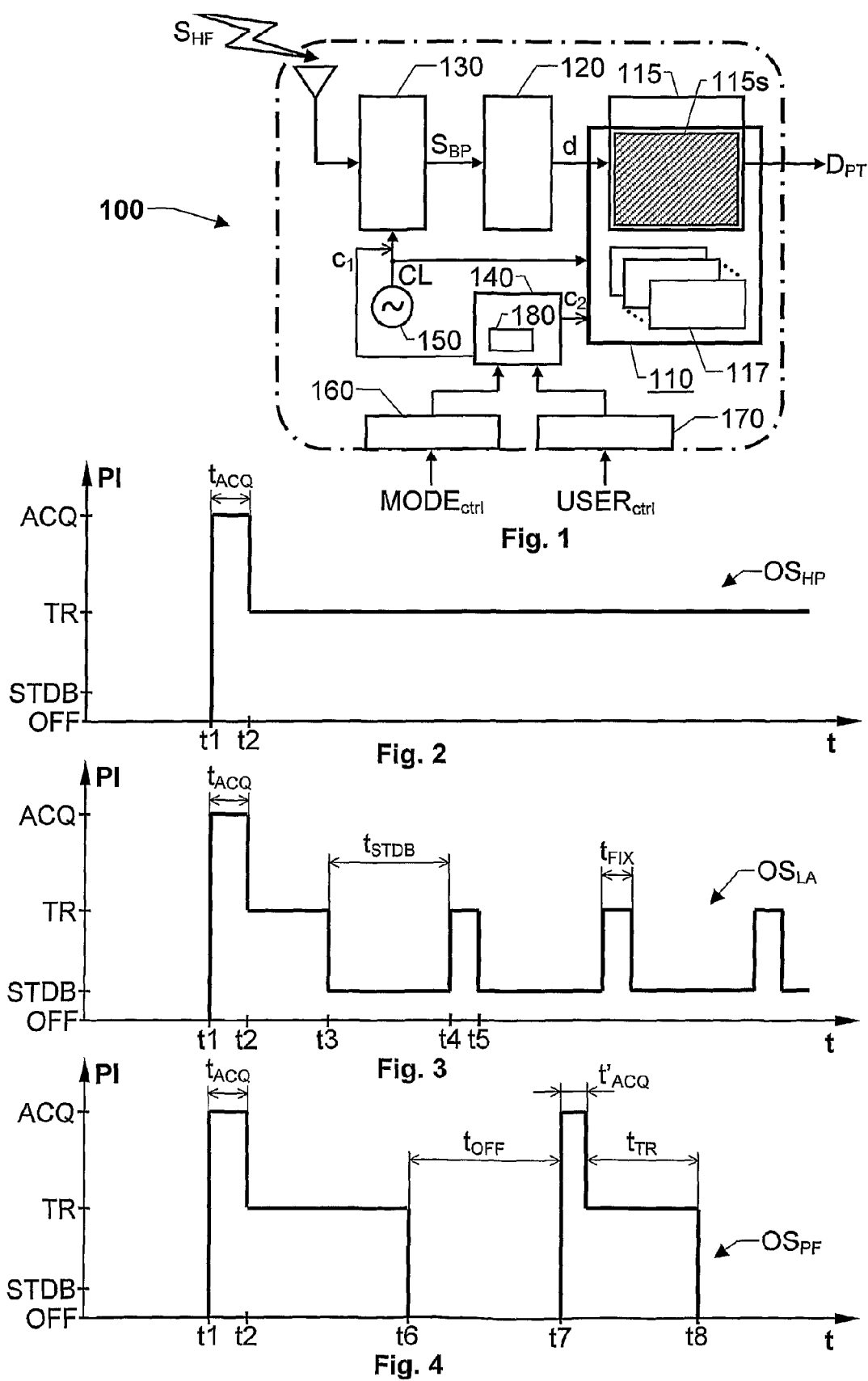

POWER EFFICIENT SOFTWARE RECEIVER FOR SPREAD SPECTRUM SIGNALS

THE BACKGROUND OF THE INVENTION AND PRIOR ART

The present invention relates generally to reception and processing of spread spectrum signals. More particularly the invention relates to a spread spectrum signal receiver according to the preamble of claim 1 and a method of operating a spread spectrum signal receiver according to claim 13. The invention also relates to a computer program according to claim 24 and a computer readable medium according to claim 25.

Spread spectrum transmission solutions are becoming increasingly important, for instance in global navigation satellite systems (GNSS). Presently, the Global Positioning System (GPS; U.S. Government) is the dominating standard, however alternative standards exist and are expected to gain increased importance in the future. So far, the Galileo system (the European programme for global navigation services), the Quasi-Zenith Satellite System (QZSS; Advanced Space Business Corporation in Japan) and the Global Orbiting Navigation Satellite System (GLONASS; Russian Federation Ministry of Defense) constitute the alternative standards. Due to different signal formats and frequency bands of these standards a navigation receiver adapted for one GNSS, say GPS, is not able to receive and process signals from a satellite that belongs to a different GNSS, say the Galileo system.

A multi-mode receiver is required to enable use of signals from the satellites of different systems. However, including multiple receiver chains in a single device is not only expensive, it also renders the device bulky and heavy, particularly if more than two signal formats are to be processed.

Instead, to this aim, a programmable software receiver solution is desired. Namely, in such a design, the signal processing principles may be altered according to which signals that presently shall be received and processed. A software-based receiver is also desirable in cases where the GNSS receiver is co-existing with other types of signal receivers, signal processing devices and/or software applications, for example in a laptop computer, a mobile telephone or a PDA (Personal Digital Assistant).

Today, relatively few software-based solutions exist that implement GNSS receivers. The vast majority of GNSS receivers on the market include signal processing hardware, which is optimized, and exclusively used, for processing satellite signals and deriving data (e.g. reflecting position, time, distance, velocity or altitude). A number of hardware solutions for processing GPS signals, which utilize the receiver's power resources in a comparatively efficient manner are also known.

For example, the patent document U.S. Pat. No. 5,592,173 describes a GPS receiver having a normal mode and a low power standby mode. In the standby mode, the operating power is inhibited in the antenna and the frequency downconverter. Moreover, in this mode the system clock is inhibited in the digital processing system, and the microprocessor clock is inhibited in the microprocessor system. By alternating between operation in the normal mode and the standby mode the average power consumption can be reduced in relation to a permanent normal-power mode operation.

This possibility of alternately switching the receiver on and off is advantageous because it economizes the receiver's power resources, and thus allows a relatively long battery life. However, for hardware designs of this type the flexibility is limited.

SUMMARY OF THE INVENTION

The object of the present invention is therefore to provide a highly flexible solution for receiving and processing spread spectrum signals, which is as efficient as possible with respect to the processing resources used.

According to one aspect of the invention the object is achieved by the receiver as initially described, wherein the radio signal processing unit is at least partly implemented in a software running on a microprocessor. This microprocessor is also adapted to effect at least one separate software-controlled function in addition to the at least-part implementation of the radio signal processing unit. The processing resources of the microprocessor are allocated such that during periods when the radio signal processing unit operates on a relatively low processing intensity level, a first amount of processing capacity is available for the at least one separate software-controlled function, and during periods when the radio processing unit operates on a relatively high processing intensity level, a second amount of processing capacity is available for the at least one separate soft-ware-controlled function. Since the microprocessor has a constant total amount of processing capacity, the second amount is smaller than the first amount. Moreover, if the relatively high radio signal processing intensity level requires a comparatively large amount of the total amount of processing capacity, the difference between the first and second amounts may be considerable.

This receiver design is advantageous because the radio signal processing can be performed on an on-demand basis to attain a data quality which is adequate for the specific situation. At the same time, whenever possible, the microprocessor's processing resources are freed for alternative purposes. The position/time related data produced by the proposed receiver preferably pertains to geographical position, time and/or velocity parameters.

According to a preferred embodiment of this aspect of the invention, the radio signal processing unit is entirely implemented in the software which runs on the microprocessor. Thereby, no signal-format specific hardware is required, which vouches for cost efficiency and implementation flexibility.

According to another preferred embodiment of this aspect of the invention, the receiver is adapted to operate in at least two operation modes. A unique operation scheme is defined for each operation mode. The operation scheme specifies how the processing performed by the radio signal processing unit shall be distributed over time between the at least two processing intensity levels. Thereby, the different operation modes may be adapted to meet the particular requirements of various use cases, or scenarios, for the receiver.

According to yet another preferred embodiment of this aspect of the invention, the processing intensity levels include a signal-source-acquisition level at which the radio signal processing unit is adapted to operate when searching for, identifying and synchronizing with at least one radio signal source. A first estimate of the position/time related data may also be generated while the unit operates on the signal-source-acquisition level. This intensity level is desirable when the receiver initiates signal reception, either for the first time or after a dormant period during which no signals have been received.

According to another preferred embodiment of this aspect of the invention, the processing intensity levels include a tracking level at which the radio signal processing unit is adapted to operate when receiving signals from a number of identified radio signal sources. Based on the received signals, the receiver repeatedly produces updatings of the position/ time related data, for instance each second. This intensity level is desirable when tracking at least one of the signals sources identified during the signal-source-acquisition phase.

According to still another preferred embodiment of this aspect of the invention, the processing intensity levels include a stand-by level at which the radio signal processing unit is adapted to operate during a stand-by interval while maintaining a predefined synchronicity accuracy with at least one previously identified radio signal source. Preferably, when operating the radio signal processing unit on this level, the receiver is adapted to receive a signal from at most one identified radio signal source. The stand-by level is desirable because it provides a very power efficient operation mode for the signal processing unit.

According to yet another preferred embodiment of this aspect of the invention, the processing intensity levels include a power-off level at which the radio signal processing unit is adapted to operate in a manner that avoids processing of any radio signals. Thus, a largest possible amount of processing capacity in the microprocessor is made available for the at least one separate software-controlled function.

According to one preferred embodiment of this aspect of the invention, the receiver includes a radio front-end module and a system clock unit. The radio front-end module is adapted to receive the radio signals and perform sampling and digitizing thereof to enable further processing of the signals. The system clock unit is adapted to deliver a clock signal to each of the radio signal processing unit and the radio front-end module. However, when the radio signal-processing unit operates on the power-off level, the receiver is adapted to inhibit the clock signal to the radio front-end module and/or inhibit the power supply to the radio front-end module. Thereby, the power consumption in this module can be held very low during periods when no radio signals are received.

According to another preferred embodiment of this aspect of the invention, the operation modes include a high performance mode. For this mode the operation scheme defines an initial signal-source-acquisition level operation for the radio signal processing unit, and a subsequent tracking-level operation for the radio signal-processing unit. In this mode accurate data can be produced with a high updating frequency.

According to still another preferred embodiment of this aspect of the invention, the operation modes include a location-awareness mode. Here, the operation scheme defines an initial signal-source-acquisition level operation for the radio signal processing unit, and a subsequent phase during which the radio signal processing unit is controlled to alternately operate on the tracking level and the stand-by level. This operation mode is advantageous to apply when a relatively high degree of data accuracy is desired, however, the power consumption should be minimized.

According to another preferred embodiment of this aspect of the invention, the receiver includes at least one interface which is adapted to receive at least one control signal. The control signal, in turn, is adapted to influence: a time ratio of operation on the tracking level and the stand-by level respectively; time instances at which the radio signal processing unit is controlled to operate on the tracking level; and/or time instances at which the radio signal processing unit is controlled to operate on the stand-by level. The proposed control signals are advantageous in that they render it possible to adapt the receiver's behavior depending on outer circumstances, such as a current velocity experienced by the receiver, a processing load placed on the microprocessor by the at least one separate software-controlled function or user-set parameters. Hence, the receiver preferably includes a user interface which is adapted to receive any user-initiated measurement control commands.

According to one preferred embodiment of this aspect of the invention, the operation modes include a push-to-fix mode. After reception of a user-initiated measurement control command, the operation scheme for this mode defines: an initial signal-source-acquisition level operation for the radio signal processing unit, and a subsequent tracking-level operation for the radio signal processing unit during at least a predefined measurement period. Thereby, a user may specifically choose each point in time when he/she desires an updating of the position/time related data.

According to another preferred embodiment of this aspect of the invention, after expiry of the predefined measurement period, the receiver is adapted to control the radio signal processing unit to operate on the power-off level, so that the energy resources are economized.

According to another aspect of the invention the object is achieved by the method referred to initially. This method presumes that the receiver is adapted to receive a number of radio signals, and based thereon derive position/time related data. Moreover, a radio signal processing unit of the receiver is at least partly implemented in a software running on a microprocessor, which is adapted to effect at least one separate software-controlled function in addition to the at least-part implementation of the radio signal processing unit. The method involves controlling the radio signal processing unit to operate on one of at least two processing intensity levels each at which an amount of processing per time unit is different. As a result, a first amount of processing capacity is available for the at least one separate software-controlled function during periods when the radio signal processing unit operates on a relatively low processing intensity level; and a second amount of processing capacity available for the at least one separate software-controlled function during periods when the radio processing unit operates on a relatively high processing intensity level. Provided that the microprocessor's total amount of processing capacity is constant, the second amount is always smaller than the first amount.

The advantages of this method, as well as the preferred embodiments thereof, are apparent from the discussion hereinabove with reference to the proposed receiver.

According to an additional aspect of the invention the object is achieved by a computer program directly loadable into the internal memory of a computer, comprising software for performing the above-proposed method when the program is run on a computer.

According to another aspect of the invention the object is achieved by a computer readable medium, having a program recorded thereon, where the program is to make a computer perform the above proposed method.

Generally, the present invention is advantageous in that it strikes a good balance between flexibility, data quality and processing demand. The processing demand is often expressed in terms of MIPS (i.e. Mega Instructions Per Second), and has a strong correlation with the over-all power consumption of the receiver.

BRIEF DESCRIPTION OF THE DRAWINGS

The present invention is now to be explained more closely by means of preferred embodiments, which are disclosed as examples, and with reference to the attached drawings.

FIG. 1 shows a block diagram of a spread spectrum signal receiver according to one embodiment of the invention, FIGS. 2-4 show graphs illustrating different operation schemes for the radio signal processing unit of the receiver according to embodiments of the invention.

Figure 5:
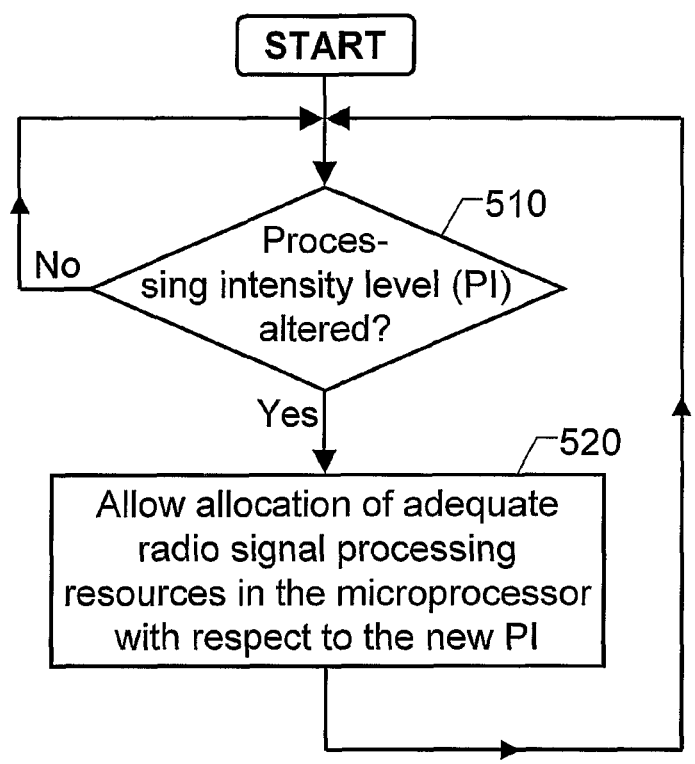
FIG. 5 illustrates, by means of a flow diagram, the general method of operating the receiver according to the invention.

DESCRIPTION OF PREFERRED
EMBODIMENTS OF THE INVENTION

FIG. 1 shows a block diagram of a spread spectrum signal receiver 100 according to one embodiment of the invention. The receiver 100 is adapted to receive a number of radio signals $S_{HF}$, and in response thereto produce position/time related data $D_{PT}$, for instance reflecting geographical position, time, distance traveled, current velocity, average velocity and/or altitude.

The receiver 100 includes a microprocessor 110, a radio signal processing unit 115 and a radio front-end module 130. The radio front-end module 130 is adapted to receive the radio signals $S_{HF}$ and perform sampling and digitizing $S_{BP}$ thereof, so that the radio signal processing unit 115 can perform relevant further signal processing to generate the data $D_{PT}$. For example, the module 130 may directly sample a bandpass version of the radio signals $S_{HF}$, or the module 130 may execute I/Q bandpass sampling, and thus frequency downconvert the received signals to the baseband. According to the invention, the signal processing unit 115 is at least partly implemented in a software 115s running on the microprocessor 110. Preferably a substantial portion of the unit 115 is implemented in software, and according to one embodiment of the invention, the radio signal-processing unit 115 is entirely implemented in the software 115s.

Moreover, the receiver 100 is adapted to operate the radio signal processing unit 115 on at least two processing intensity levels each at which an amount of processing per time unit performed by the microprocessor 110 is different. In addition to the at least-part implementation of the radio signal processing unit 115, the microprocessor 110 is adapted to effect at least one separate software-controlled function 117, such as processing other radio signals (e.g. of a mobile telecommunications system), or executing arbitrary software application. Hence, during periods when the radio signal processing unit 115 operates on a relatively low processing intensity level, a first amount of processing capacity is available for the separate software-controlled function(s) 117; and correspondingly, during periods when the radio processing unit 115 operates on a relatively high processing intensity level, a second amount of processing capacity is available for the separate software-controlled function(s) 117. We presume that the microprocessor 110 has an over-all constant processing capacity, so the second amount of processing capacity is always smaller than the first amount.

For example, if the microprocessor 110 has a capacity of 500 MIPS, a relatively high radio signal processing intensity of 100 MIPS leaves up to 400 MIPS to the separate software-controlled function(s) 117, and a relatively low radio signal processing intensity of 10 MIPS renders it possible for the function(s) 117 to use as much as 490 MIPS. If instead, the microprocessor 110 only has a capacity of 250 MIPS, the relatively high radio signal processing intensity of 100 MIPS and the relatively low radio signal processing intensity of 10 MIPS, creates a range from 150 MIPS to 240 MIPS for the function(s) 117. Consequently, depending on the capacity of microprocessor 110 versus the maximum processing demand of the radio-processing unit 115, the differences between the first and second amounts of processing capacity can be anything from almost zero to a substantial factor. Further, it is desirable that the radio processing unit's 115 usage of the microprocessor's 110 capacity is delimited in relative terms. For example, a maximum threshold level may be defined representing, say 60% of the microprocessor's 110 total capacity, which the processing intensity of the radio-processing unit 115 never may exceed. An average threshold level may also be defined, representing, say 20% of the microprocessor's 110 total capacity, which reflects the radio processing unit's 115 average processing intensity.

Preferably, the receiver 100 also includes a central control unit 140, at least one system clock unit 150 and a data interface 120. The interface 120 is adapted to interconnect the radio front-end module 130 with the microprocessor 110 by converting the signal $S_{BP}$ from the radio front-end module 130 to a data format d being suitable for the microprocessor 110. The central control unit 140 is adapted to control the operation of the units 110, 115, 130 and 150. This control is here schematically indicated by means of control signals $c_1$ and $c_2$.

The system clock unit 150 is adapted to deliver a clock signal CL to each of the radio signal processing unit 115 and the radio front-end module 130. In some implementations, it is preferable to have separate clock units for the radio front-end module 130 and the microprocessor 110 respectively. In any case, according to preferred embodiments of the invention, the receiver 100 is adapted to inhibit the clock signal CL and/or the power supply to the radio front-end module 130 under certain operating conditions. The inhibition of the clock signal CL may be accomplished by means of a control signal $c_1$ originated by the central control unit 140. The conditions for inhibiting the clock signal CL and/or the power supply will be discussed below with reference to FIG. 4.

Referring now to FIG. 2, we see a graph that illustrates a first proposed operation scheme $OS_{HP}$ for the radio signal-processing unit 115. The operation scheme $OS_{HP}$ defines a distribution over time t of the processing performed by the radio signal processing unit 115 between the above-mentioned processing intensity levels. Here, the graph shows four levels OFF, STDB, TR, and ACQ representing different radio signal processing intensities PI.

A first processing intensity level OFF represents a power-off level at which the radio signal processing unit 115 is controlled to avoid processing of any radio signals (i.e. here the unit 115 has no processing demand).

A second processing intensity level STDB represents a stand-by level at which the radio signal processing unit 115 is controlled to operate while maintaining a predefined synchronicity accuracy with at least one previously identified radio signal source. Preferably, the predefined synchronicity accuracy is an adjustable parameter controllable by the operating system of the microprocessor 110. Thereby, a first synchronicity accuracy can be predefined during a first interval, a second synchronicity accuracy can be predefined during a second interval, and so on. Depending on the accuracy of the internal system clock unit 150, when operating the processing unit 115 at this level, the receiver 100 may either receive a signal from one radio signal source (if the clock unit 150 has insufficient accuracy), or not receive any radio signals at all (if the clock unit 150 is accurate enough).

A third processing intensity level TR represents a tracking level at which the radio signal processing unit 115 is adapted to operate when receiving signals from a number (say 4) of identified radio signal sources, and based on the received signals repeatedly produces updatings of the position/time related data $D_{PT}$.

A fourth a processing intensity level ACQ represents a signal-source-acquisition level at which the radio signal processing unit 115 is controlled to operate when searching for, identifying and synchronizing with at least one radio signal source. According to one embodiment of the invention, the radio-processing unit 115 is also adapted to generate a first estimate of the position/time related data $D_{PT}$ while operating on the signal-source-acquisition level ACQ.

Preferably, the processing intensity levels, at least the STDB-, TR- and ACQ-levels, are adaptive in response to control signals originated by an operating system of the microprocessor 110. Hence, the behavior of the radio signal processing unit 115 can be adjusted in response to a current operating state, or scenario, for the processor 110, so that for example during periods when the processing load from the function(s) 117 is relatively high, the ACQ-level is lowered, and vice versa. Under certain conditions, when the function(s) 117 cause very high processing loads, the ACQ-level may even be lower than the TR-level.

The operation scheme $OS_{HP}$ in FIG. 2 defines a high performance mode, wherein during an initial acquisition phase $t_{ACQ}$ from t1 to t2, the radio signal processing unit 115 is controlled to operate on the signal-source-acquisition-level ACQ (in order to search for, identify and synchronize with a sufficient number of radio signal sources). Thereafter, the operation scheme $OS_{HP}$ specifies that the radio signal processing unit 115 shall be operated on the tracking-level TR (in order to continue to receive signals from a number of identified radio signal sources, and based on the received signals repeatedly produce updatings of the position/time related data $D_{PT}$).

This mode of operation is generally preferable when the power supply to the receiver 100 is ample. Namely, the ongoing tracking-level operation of the processing unit 115 results in a relatively high processing demand (or MIPS consumption). However, the high performance mode is normally most relevant to apply when traveling in a car, or other vehicle, and then apart from any map/navigation applications, the processing demand of the separate software-controlled functions 117 is typically low because the user/driver must be focused on the driving (rather than interacting with the functions 117). Nevertheless, in cases when the radio signal-processing unit 115 must operate in the high performance mode contemporaneously with a very high processing load from the functions 117, the signal-source-acquisition-level ACQ may have to be reduced substantially, perhaps even below the tracking-level TR. Then, the initial acquisition phase $t_{ACQ}$ will normally have to be prolonged considerably.

FIG. 3 shows a graph, which illustrates a second operation scheme $OS_{LA}$ for the radio signal-processing unit 115. This operation scheme $OS_{LA}$ represents a location-awareness mode, wherein during an initial acquisition phase from t1 to t2, the radio signal processing unit 115 is controlled to operate on the signal-source-acquisition-level ACQ (in order to search for, identify and synchronize with a sufficient number of radio signal sources). Subsequently, the radio signal processing unit 115 is controlled to alternately operate on the tracking level TR and the stand-by level STDB.

A first tracking-level operation may be performed from t2 to t3. During this period the receiver 100 receives signals from a number of identified radio signal sources, and based thereon produces one or more updatings of the position/time related data $D_{PT}$. Then, at t3, the receiver 100 switches to operating the radio signal processing unit 115 on the stand-by level STDB (to maintain a predefined synchronicity accuracy with at least one radio signal sources identified during the initial acquisition-level operation). A maximum extent of the stand-by-level operation is determined by the accuracy of the system clock unit 150 and the rate at which updatings of the position/time related data $D_{PT}$ is desired. Here, the stand-by-level operation $t_{STDB}$ continues until t4, when again the radio signal processing unit 115 is controlled to operate on the tracking level TR. Preferably, this tracking-level operation is only maintained during an interval $t_{FIX}$ required to accomplish one updating of the position/time related data $D_{PT}$. Thereafter, the unit 115 returns to stand-by-level operation, and so on.

As mentioned above, during the stand-by interval $t_{STDB}$, the receiver 100 is preferably controlled to receive a signal from at most one identified radio signal source. It is also desirable if the start and duration of the stand-by interval $t_{STDB}$ may be controlled by the operating system of the microprocessor 110. Thus, the behavior of the radio signal-processing unit 115 can be further adjusted in response to the current operating state, or scenario, for the processor 110. For example, the radio signal processing unit 115 can be controlled to operate on the signal-source-acquisition level ACQ when the separate software-implemented functions 117 cause a relatively low processing load.

The location-awareness-mode of operation is generally preferable when the separate software-implemented functions 117 with which the receiver 100 co-exists require a relatively high processing intensity. Namely, the average processing intensity required in this mode is relatively low.

FIG. 4 shows a graph, which illustrates a third operation scheme $OS_{PF}$ for the radio signal processing unit 115. This operation scheme $OS_{PF}$ defines a push-to-fix mode, wherein the radio signal processing unit 115 is controlled to operate on the signal-source-acquisition level ACQ during an initial phase from t1 to t2 in response to a user-initiated measurement control command $USER_{ctrl}$. Thereafter follows a period during which the radio signal-processing unit 115 is controlled to operate on the tracking-level TR, so that one or more updatings of the position/time related data $D_{PT}$ can be performed. Subsequently, at t6, the radio signal processing unit 115 is controlled to operate on the OFF level until t7, when we assume that a new user-initiated measurement control command $USER_{ctrl}$ is received. The interval from t6 to t7 is denoted $t_{OFF}$, and may have arbitrary extension. During the power-off interval $t_{OFF}$, the central control unit 140 may produce the control signal $c_1$ in order to inhibit the power supply and/or the clock signal CL to the radio front-end module 130, and thus reduce the receiver's 100 over-all power consumption.

At t7, the radio signal-processing unit 115 is again controlled to operate on the signal-source-acquisition level ACQ during an interval $t'_{ACQ}$ having an appropriate extension to enable the receiver 100 to search for, identify and synchronize with a sufficient number of radio signal sources. Thereafter follows another measurement period $t_{TR}$ of tracking-level TR operation of the radio signal processing unit 115. The measurement period $t'_{ACQ}$ has a predefined extension that is sufficient to allow at least one updating of the position/time related data $D_{PT}$. Provided that $t_{OFF}$ is not exceedingly long in relation to the accuracy/frequency stability of the system clock unit 150, the measurement period $t'_{ACQ}$ after t7 can normally be made somewhat shorter than the initial acquisition phase $t_{ACQ}$ from t1 to t2, when the reception of the radio signals $S_{HF}$ is started for the first time.

The push-to-fix-mode operation is generally preferable when assisted GNSS information is available, for example indoors, or otherwise whenever a relatively low updating frequency is acceptable Returning now to the FIG. 1. According to one embodiment of the invention, the receiver 100 includes a control interface 160 and/or a user interface 170, which each is adapted to receive control signals $MODE_{ctrl}$ and $USER_{ctrl}$ respectively. The control signals $MODE_{ctrl}$ and $USER_{ctrl}$ may influence a time ratio of the operation on the tracking level TR and the stand-by level STDB respectively; time instances at which the radio signal processing unit 115 is controlled to operate on the tracking level TR (see e.g. t2 and t4 in the FIG. 3), and/or time instances at which the radio signal processing unit 115 is controlled to operate on the stand-by level STDB (see e.g. t3 and t5 in the FIG. 3).

The control interface 160 is adapted to receive control commands $MODE_{ctrl}$, which have been automatically generated by units or applications external to the receiver. For example, various functions and events of a communication device may originate the control commands $MODE_{ctrl}$, and thus alter the receiver's 100 behavior in response to non-receiver GNSS related circumstances.

The user interface 170 is adapted to receive user-initiated measurement control commands $USER_{crtrl}$. Such a command $USER_{ctrl}$ may trigger the receiver 100 to perform a measurement. For instance, in the push-to-fix mode, after reception of a user-initiated measurement control command $USER_{ctrl}$, the receiver 100 is controlled to operate the radio signal processing unit 115 on the signal-source-acquisition level ACQ during an initial period, and thereafter to operate the unit 115 on the tracking-level during at least a predefined measurement period (in order to accomplish the measurement).

According to one embodiment of the invention, the receiver 100 includes a computer readable medium 180, having a program recorded thereon, where the program is adapted to make the central control unit 140 control the steps of the proposed procedure. The medium 180 is associated with the unit 140 either by being included therein, or by being connected thereto.

In order to sum up, the general method of processing spread spectrum signals according to the invention will now be described with reference to a flow diagram in FIG. 5.

A first step 510 investigates whether a request to alter a current processing intensity level of the radio signal processing unit 115 has been received, and if so the procedure continues to a step 520. Otherwise, the procedure loops back and stays in the step 510.

The step 520 allows processing resources in the microprocessor 110 to be allocated, which resources are adequate with respect to the new radio signal processing intensity level. Thus, when the radio signal processing unit 115 operates on a relatively low processing intensity level a first amount of processing capacity is made available for at least one separate software-controlled function 117 effected by the microprocessor 110 in addition to the at least-part implementation of the radio signal processing unit 115. Correspondingly, when the radio signal processing unit 115 operates on a relatively high processing intensity level, a second amount of processing capacity available for the at least one separate software-controlled function 117. Provided that the microprocessor 110 has a constant over-all processing capacity, first amount of processing capacity is always larger than the second amount.

The process steps described with reference to the FIG. 5 above may be controlled by means of a programmed computer apparatus, such as a microprocessor of a mobile phone, a PDA or an automotive navigation unit. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code; object code, a code intermediate source and object code such as in partially compiled form, or in any other form suitable for use in the implementation of the process according to the invention. The carrier may be any entity or device capable of carrying the program. For example, the carrier may comprise a storage medium, such as a ROM (Read Only Memory), for example a CD (Compact Disc) or a semiconductor ROM, or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A spread spectrum signal receiver adapted to receive a number of radio signals, the receiver comprising:
   a radio signal processing unit adapted to produce position/time related data in response to the received signals, the receiver being adapted to operate the radio signal processing unit on at least two processing intensity levels each at which an amount of processing per time unit is different, wherein the at least two processing intensity levels comprise a signal-source-acquisition level at which the radio signal processing unit is adapted to operate when searching for, identifying and synchronizing with at least one radio signal source, and wherein the radio signal processing unit is adapted to operate on the signal-source-acquisition level when generating a first estimate of the position/time related data;
   wherein the radio signal processing unit is at least partly implemented in a software running on a microprocessor, the microprocessor is adapted to effect at least one separate software-controlled function in addition to the at least-part implementation of the radio signal processing unit, such that:
   during periods when the radio signal processing unit operates on a relatively low processing intensity level, a first amount of processing capacity is available for the at least one separate software-controlled function, and
   during periods when the radio processing unit operates on a relatively high processing intensity level, a second amount of processing capacity is available for the at least one separate software-controlled function, the second amount being smaller than the first amount;
   wherein the receiver is further adapted to operate in at least two operation modes, and for each operation mode a unique operation scheme is defined according to which the processing performed by the radio signal processing unit is distributed over time between the at least two processing intensity levels; and
   a user interface adapted to receive user-initiated measurement control commands, the at least two operation modes further comprise:

a push-to-fix mode for which the operation scheme, after reception of a user-initiated measurement control command, defines:
an initial signal-source-acquisition level operation for the radio signal processing unit; and
a subsequent tracking-level operation for the radio signal processing unit during at least a predefined measurement period.

2. The receiver according to claim 1, wherein the radio signal processing unit is entirely implemented in the software which runs on the microprocessor.

3. The receiver according to claim 1, wherein the at least two processing intensity levels comprise a tracking level at which the radio signal processing unit is adapted to operate when receiving signals from a number of identified radio signal sources, and based thereon repeatedly producing updates of the position/time related data.

4. The receiver according to claim 1, wherein the at least two processing intensity levels comprise a stand-by level at which the radio signal processing unit is adapted to operate during a stand-by interval while maintaining a predefined synchronicity accuracy with at least one previously identified radio signal source.

5. The receiver according to claim 4, wherein when the radio signal processing unit operates on the stand-by level, the receiver is adapted to receive a signal from at most one identified radio signal source.

6. The receiver according to claim 1, wherein the at least two processing intensity levels comprise a power-off level at which the radio signal processing unit is adapted to operate in a manner which avoids processing of any radio signals.

7. The receiver according to claim 6, wherein the receiver further comprises:
a radio front-end module adapted to receive the radio signals and perform sampling and digitizing thereof; and
a system clock unit adapted to deliver a clock signal to each of the radio signal processing unit and the radio front-end module;
wherein when the radio signal-processing unit operates on the power-off level, the receiver is adapted to inhibit the clock signal to the radio front-end module.

8. The receiver according to claim 6, wherein the receiver further comprises:
a radio front-end module adapted to receive the radio signals and perform sampling and digitizing thereof;
wherein when the radio signal-processing unit operates on the power-off level, the receiver is adapted to inhibit a power supply to the radio front-end module.

9. The receiver according to claim 1, wherein the at least two operation modes further comprise:
a high performance mode for which the operation scheme defines:
an initial signal-source-acquisition level operation for the radio signal processing unit; and
a subsequent tracking-level operation for the radio signal processing unit.

10. The receiver according to claim 1, wherein the at least two operation modes further comprise:
a location-awareness mode for which the operation scheme defines:
an initial signal-source-acquisition level operation for the radio signal processing unit; and
a subsequent phase during which the radio signal processing unit is controlled to alternately operate on the tracking level and the stand-by level.

11. The receiver according to claim 10, wherein the receiver further comprises:
at least one interface adapted to receive at least one control signal influencing at least one of a time ratio of operation on the tracking level and the stand-by level respectively, time instances at which the radio signal processing unit is controlled to operate on the tracking level, and time instances at which the radio signal processing unit is controlled to operate on the stand-by level.

12. The receiver according to claim 1, wherein the receiver is adapted to, after expiry of the predefined measurement period, control the radio signal processing unit to operate on the power-off level.

13. A method of operating a spread spectrum signal receiver, the receiver being adapted to receive a number of radio signals and based thereon derive position/time related data, and a radio signal processing unit of the receiver being at least partly implemented in software running on a microprocessor which is adapted to effect at least one separate software-controlled function in addition to the at-least-part implementation of the radio signal processing unit, the method comprising:
controlling the radio signal processing unit to operate on one of at least two processing intensity levels each at which an amount of processing per time unit is different;
adapting the radio signal processing unit to operate at a signal-source-acquisition level of the at least two processing intensity levels when searching for, identifying and synchronizing with at least one radio signal source;
rendering a first amount of processing capacity available for the at least one separate software-controlled function during periods when the radio signal processing unit operates on a relatively low processing intensity level, and a second amount of processing capacity available for the at least one separate software-controlled function during periods when the radio processing unit operates on a relatively high processing intensity level, the first amount being larger than the second amount; and
controlling the receiver to operate in one of at least two operation modes, each mode being associated with a unique operation scheme which defines a distribution over time of the processing performed by the radio signal processing unit between the at least two processing intensity levels
wherein the at least two operation modes comprising a push-to-fix mode for which the operation scheme, after reception of a user-initiated measurement control command, comprises:
controlling the radio signal processing unit to operate on an initial signal-source-acquisition level; and
controlling the radio signal processing unit to operate on a subsequent tracking-level during at least a predefined measurement period.

14. The method according to claim 13, comprising:
entirely implementing the radio signal processing unit in the software which runs on the microprocessor.

15. The method according to claim 13, comprising:
adapting the radio processing unit to operate on the signal-source-acquisition level when generating a first estimate of the position/time related data.

16. The method according to claim 13, comprising:
adapting the radio signal processing unit to operate at a tracking level of the at least two processing intensity levels when receiving signals from a number of identified radio signal sources; and based thereon repeatedly producing updates of the position/time related data.

17. The method according to claim 13, comprising:
controlling the signal processing unit to operate at a stand-by level of the at least two processing intensity levels during a stand-by interval while maintaining a predefined syn-chronicity accuracy with at least one previously identified radio signal source.

18. The method according to claim 17, wherein during the stand-by interval the method further comprises:
controlling the radio signal processing unit to operate on the stand-by level; and
controlling the receiver to receive a signal from at most one identified radio signal source.

19. The method according to claim 13, comprising:
controlling the radio signal processing unit to operate at a power-off level of the at least two processing intensity levels to avoid processing of any radio signals.

20. The method according to claim 13, wherein the at least two operation modes comprising a high performance mode for which the operation scheme comprises:
operating the radio signal processing unit at an initial signal-source-acquisition-level; and
operating the radio signal processing unit at a subsequent tracking-level.

21. The method according to claim 13, wherein the at least two operation modes comprising a location-awareness mode for which the operation scheme further comprises:
operating the radio signal processing unit at an initial signal-source-acquisition-level; and
subsequently controlling the radio signal processing unit to alternately operate on the tracking level and the stand-by level.

22. The method according to claim 21, comprising:
receiving at least one control signal influencing at least one of:
a time ratio of operation on the tracking level and the stand-by level respectively;
time instances at which the radio signal processing unit is controlled to operate on the tracking level; and
time instances at which the radio signal processing unit is controlled to operate on the stand-by level.

23. The method according to claim 13, comprising:
controlling the radio signal processing unit to operate on the power-off level after expiry of the predefined measurement period.

24. A computer program stored on a non-transitory computer readable medium and directly loadable into the internal memory of a computer for operating a spread spectrum signal receiver, the receiver being adapted to receive a number of radio signals and based thereon derive position/time related data, and a radio signal processing unit of the receiver being at least partly implemented in software running on a microprocessor which is adapted to effect at least one separate software-controlled function in addition to the at least-part implementation of the radio signal processing unit, said computer program comprising:
instructions for controlling the radio signal processing unit to operate on one of at least two processing intensity levels each at which an amount of processing per time unit is different;
instructions for adapting the radio signal processing unit to operate at a signal-source-acquisition level of the at least two processing intensity levels when searching for, identifying and synchronizing with at least one radio signal source;
instructions for rendering a first amount of processing capacity available for the at least one separate software-controlled function during periods when the radio signal processing unit operates on a relatively low processing intensity level, and a second amount of processing capacity available for the at least one separate software-controlled function during periods when the radio processing unit operates on a relatively high processing intensity level, the first amount being larger than the second amount; and
instructions for controlling the receiver to operate in one of at least two operation modes, each mode being associated with a unique operation scheme which defines a distribution over time of the processing performed by the radio signal processing unit between the at least two processing intensity levels,
wherein the at least two operation modes comprising a push-to-fix mode for which the operation scheme, after reception of a user-initiated measurement control command, comprises:
instructions for controlling the radio signal processing unit to operate on an initial signal-source-acquisition level; and
instructions for controlling the radio signal processing unit to operate on a subsequent tracking-level during at least a predefined measurement period.

25. A non-transitory computer readable medium, having a computer program recorded thereon for operating a spread spectrum signal receiver, the receiver being adapted to receive a number of radio signals and based thereon derive position/time related data and a radio signal processing unit of the receiver being at least partly implemented in software running on a microprocessor which is adapted to effect at least one separate software-controlled function in addition to the at least-part implementation of the radio signal processing unit, said computer program comprising:
instructions for controlling the radio signal processing unit to operate on one of at least two processing intensity levels each at which an amount of processing per time unit is different;
instructions for adapting the radio signal processing unit to operate at a signal-source-acquisition level of the at least two processing intensity levels when searching for, identifying and synchronizing with at least one radio signal source;
instructions for rendering a first amount of processing capacity available for the at least one separate software-controlled function during periods when the radio signal processing unit operates on a relatively low processing intensity level, and a second amount of processing capacity available for the at least one separate software-controlled function during periods when the radio processing unit operates on a relatively high processing intensity level, the first amount being larger than the second amount; and
instructions for controlling the receiver to operate in one of at least two operation modes, each mode being associated with a unique operation scheme which defines a distribution over time of the processing performed by the radio signal processing unit between the at least two processing intensity levels,
wherein the at least two operation modes comprising a push-to-fix mode for which the operation scheme, after reception of a user-initiated measurement control command, comprises:
instructions for controlling the radio signal processing unit to operate on an initial signal-source-acquisition level; and
instructions for controlling the radio signal processing unit to operate on a subsequent tracking-level during at least a predefined measurement period.

\* \* \* \* \*